(12) United States Patent
Rector et al.

(10) Patent No.: US 7,512,838 B2
(45) Date of Patent: Mar. 31, 2009

(54) DATA INTEGRITY ANALYSIS FOR A DATA STORAGE SYSTEM

(75) Inventors: Richard Douglas Rector, Arvada, CO (US); Walter Wong, Boulder, CO (US)

(73) Assignee: Spectra Logic Corporation, Denver, CO (US)

( * ) Notice: Subject to any disclaimer, the term of this patent is extended or adjusted under 35 U.S.C. 154(b) by 557 days.

(21) Appl. No.: 11/126,025

(22) Filed: May 10, 2005

(65) Prior Publication Data
US 2006/0259816 A1 Nov. 16, 2006

(51) Int. Cl.
*G06F 11/00* (2006.01)
(52) U.S. Cl. .......................................... 714/14; 711/114
(58) Field of Classification Search .................... 714/14; 713/324
See application file for complete search history.

(56) References Cited

U.S. PATENT DOCUMENTS

| | | | |
|---|---|---|---|
| 5,504,858 A | | 4/1996 | Ellis et al. |
| 5,608,684 A | * | 3/1997 | Reasoner et al. ............ 365/228 |
| 5,864,849 A | * | 1/1999 | Bohannon et al. ............. 707/8 |
| 5,928,368 A | * | 7/1999 | Jardine et al. ................ 714/22 |
| 5,950,230 A | * | 9/1999 | Islam et al. ................. 711/156 |
| 6,161,192 A | | 12/2000 | Lubbers et al. |
| 2004/0078666 A1 | * | 4/2004 | Aasheim et al. .............. 714/24 |
| 2004/0083405 A1 | * | 4/2004 | Chang et al. ................. 714/24 |
| 2004/0105187 A1 | | 6/2004 | Woodruff et al. |
| 2004/0223253 A1 | | 11/2004 | Woodruff et al. |
| 2004/0264037 A1 | | 12/2004 | Downey et al. |
| 2004/0264038 A1 | | 12/2004 | Heineman et al. |
| 2004/0264039 A1 | | 12/2004 | Armagost et al. |
| 2004/0264040 A1 | | 12/2004 | Armagost et al. |
| 2004/0264041 A1 | | 12/2004 | Kumpon et al. |

(Continued)

FOREIGN PATENT DOCUMENTS

WO  WO 2005/010661 A2  2/2005

(Continued)

OTHER PUBLICATIONS

U.S. Appl. No. 10/950,613, Starr et al.

(Continued)

*Primary Examiner*—Scott T. Baderman
*Assistant Examiner*—Kamini Patel (57) ABSTRACT

Disclosed is a method and apparatus relating generally to analysis techniques for data integrity following an un-safe power down occurrence of non-tape media components comprising a storage system. The data storage system comprises at least one random access memory storage device adapted to be power cycled in at least an on and off condition. The random access memory storage device comprises at least one storage medium comprising a first stored data segment. The storage device is adapted to receive data for storage on the medium in at least a second data segment. At least one state bit has a first state associated with the second data segment during the storage of the second data segment and a second state associated with the second data segment after completion of the storage of the second data segment wherein the state bit is stored in non volatile memory associated with the storage device. The state bit is capable of being accessed to determine completion status of the storage of at least the second data segment after the storage device is power cycled in the on condition.

24 Claims, 11 Drawing Sheets

U.S. PATENT DOCUMENTS

| | | |
|---|---|---|
| 2004/0264042 A1 | 12/2004 | Pollard et al. |
| 2005/0007692 A1 | 1/2005 | Thompson et al. |
| 2005/0047258 A1 | 3/2005 | Starr et al. |
| 2005/0057847 A1 | 3/2005 | Armagost et al. |
| 2005/0063089 A1 | 3/2005 | Starr et al. |
| 2005/0065637 A1 | 3/2005 | Lantry et al. |
| 2005/0185323 A1 | 8/2005 | Brace et al. |
| 2005/0195517 A1 | 9/2005 | Brace et al. |
| 2005/0195518 A1 | 9/2005 | Starr et al. |
| 2005/0195519 A1 | 9/2005 | Kumpon et al. |
| 2005/0195520 A1 | 9/2005 | Starr et al. |
| 2005/0219964 A1 | 10/2005 | Pollard et al. |
| 2005/0246484 A1 | 11/2005 | Lantry et al. |
| 2005/0267627 A1 | 12/2005 | Lantry et al. |
| 2006/0031714 A1* | 2/2006 | Batchelor et al. .............. 714/14 |
| 2006/0112296 A1* | 5/2006 | Sheahan et al. ................ 714/2 |

FOREIGN PATENT DOCUMENTS

| | | |
|---|---|---|
| WO | US05/45168 | 12/2005 |
| WO | US05/46447 | 12/2005 |

OTHER PUBLICATIONS

U.S. Appl. No. 10/951,321, Wong.
U.S. Appl. No. 10/980,594, Fenske et al.
U.S. Appl. No. 11/011,812, Starr et al.
U.S. Appl. No. 11/019,911, Curtis et al.
U.S. Appl. No. 11/037,985, Permut et al.
U.S. Appl. No. 11/040,937, Starr et al.
U.S. Appl. No. 11/089,749.
U.S. Appl. No. 11/123,725, Rector et al.
U.S. Appl. No. 11/145,768, Downey et al.
U.S. Appl. No. 11/230,146, Starr et al.
U.S. Appl. No. 11/240,893, Starr et al.
U.S. Appl. No. 11/264,920, Lantry et al.

* cited by examiner

DATA INTEGRITY ANALYSIS FOR A DATA STORAGE SYSTEM

CROSS-REFERENCE TO RELATED APPLICATIONS

None.

FIELD OF THE INVENTION

The present invention relates generally to analysis techniques for data integrity following an un-safe power fluctuation occurrence of non-tape media components comprising a storage system.

BACKGROUND

Tape libraries have historically been the primary storage devices for amassed digital data. This has been due in part because of the tape libraries' ability to store large amounts of data in a cost-efficient and data-stable manner. Other types of storage systems containing alternative media such as disc drives, however, are beginning to gain momentum as a consequence of advancements in the technology. Disc drive-based systems generally facilitate an additional level of flexibility in the way data is stored. Depending on the configuration of the storage system, the random access functionality of disc drives can dramatically speed up data transfer between a host and storage system. Such advances are embodied, for example, in a Virtual Tape Library (VTL) which is a leading alternative to the traditional tape library.

VTLs are generally promoted as faster, more versatile backup systems than the traditional tape-based libraries. A VTL works by emulating legacy tape libraries by operating with standard tape backup software. Put simply, a VTL can be adapted to present the appearance of a tape library of almost any make and model to a host. Hence, data can be transmitted to a VTL in streaming protocol whereby data can be stored on media as a contiguous data packet emulating the linear last-in/last-stored format of tape media. Such data transmitted by a host is typically received by a buffer system in the VTL capable of accepting the data transmission at high speeds. The buffer then transmits the data at a buffered rate, typically slower, tailored for the speed at which the storage media is capable of storing the data.

In some instances, power supplying a VTL may be unexpectedly reduced to some power level less than enough for full operation of the VTL. For example, the power may be interrupted due to a power outage wherein the power is cycled from an on condition to an off condition, while data is being received by the VTL. Alternatively, a data storage system operating under the protection of fault protection circuitry may suffer variations in supplied power, such as power spikes or other undesirable power surges or conditions. The consequence of such power fluctuations may result in data being incompletely stored or even corrupted. Under these circumstances, one method of determining if stored or redundant data has been affected is to compare, on a random sample or bit-by-bit basis, all of the primary data with the redundant data (if the VTL supports redundant data capabilities), once power is fully re-supplied to the VTL. Needless to say, comparing data to find discrepancies between redundant data and primary data or the point at which data storage was terminated can often be time-consuming.

The invention described herein is generally directed to improvements to the time consuming data comparing exercise following interrupted data storage.

SUMMARY OF THE INVENTION

The present invention relates generally to analysis techniques for data integrity following an un-safe power fluctuation occurrence of at least non-tape media components comprising a storage system and provides methods and apparatus to analyze data segments within the data body stored on a storage device to isolate individually compromised data segments.

One embodiment of the present invention can therefore comprise a data storage system comprising: at least one random access memory storage device adapted to be power cycled in at least an on and off condition; the random access memory storage device comprising at least one storage medium comprising a first stored data segment; the storage device adapted to receive data for storage on the medium in at least a second data segment; at least one state bit having a first state associated with the second data segment during the storage of the second data segment and a second state associated with the second data segment after completion of the storage of the second data segment wherein the state bit is stored in non volatile memory associated with the storage device; and the state bit capable of being accessed to determine completion status of the storage of at least the second data segment after the storage device is power cycled in the on condition.

An alternative embodiment of the present invention can therefore comprise a method for analyzing data integrity in a data storage system comprising the steps of: receiving data; storing the data as at least a new data segment on at least one storage medium comprised by at least one non-tape storage device further comprising at least one previously stored data segment; assigning at least one state bit to the new data segment wherein the state bit is in a first state before the new data segment is fully stored on the storage medium and the state bit is in a second state after the new data segment is the fully stored on the storage medium; saving the state bit in non volatile memory associated with the storage device; cycling the non-tape storage medium from a condition less than an on condition to an on condition; accessing the state bits; and determining a storage completion status for at least the new data segment based on the first or the second state of the state bit.

In yet another alternative embodiment of the present invention can therefore comprise a means for analyzing data integrity in a data storage system comprising: means for receiving data; means for storing the data as at least a second data segment on at least one storage medium comprised by at least one non-tape storage device already comprising a first data segment; means for assigning at least one state bit to the second data segment wherein the state bit is in a first state before the second data segment is fully stored on the storage medium and the state bit is in a second state after the second data segment is the fully stored on the storage medium; means for saving the state bit in non volatile memory associated with the storage device; means for cycling the non-tape storage medium from at least an off condition to an on condition; means for accessing the state bit; and means for determining a storage completion status based on the first or the second state of the state bit.

In yet another alternative embodiment of the present invention can therefore comprise a data storage arrangement comprising: a host computer; a storage system in communication with the host computer, the storage system comprising at least one random access storage medium adapted to be power cycled in at least an on and off condition; the random access storage medium adapted to receive at least one new data segment by streaming protocol for storage of emulated in a contiguous sequential format and wherein the random access storage medium already comprises at least one old data segment previously stored in the format; at least one state bit having a first state associated with the new data segment during the storage of the new data segment and a second state associated with the new data segment after completion of the storage of the new data segment wherein the state bit is stored in non volatile memory associated with the random access memory storage device; and the state bit capable of being accessed to determine completion status of the storage of the new data segment when the random access memory storage device is power cycled in the on condition.

In yet another alternative embodiment of the present invention can therefore comprise A method for checking integrity of a data segment stored on a data storage medium associated with a data storage library, comprising the steps of: detecting a power fluctuation condition to the data storage library, and upon detection and completion of the power fluctuation condition, checking a state bit stored in a non volatile memory associated with the data segment to determine whether such data segment has a desired integrity.

DETAILED DESCRIPTION

Figure 1A:
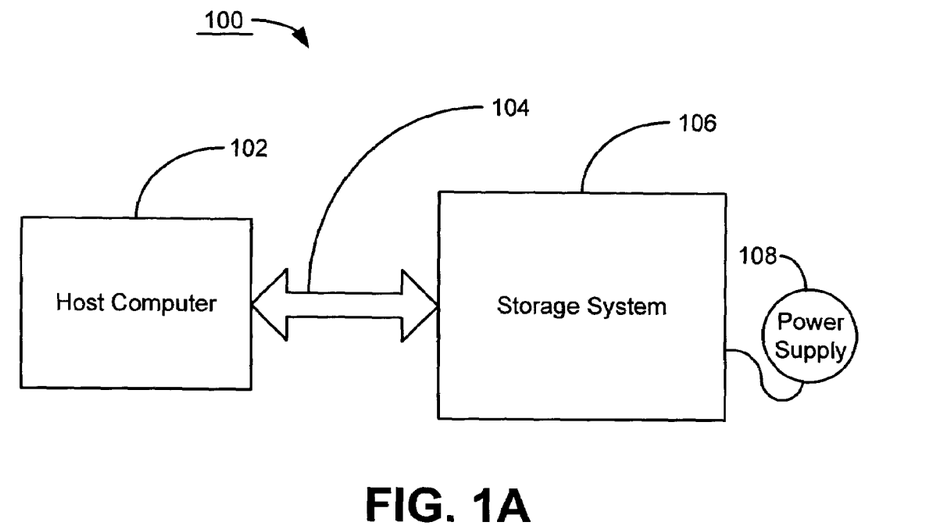
FIG. 1A is a block diagram of a data storage arrangement constructed in accordance with an embodiment of the present invention.

Referring to the drawings in general, and more specifically to FIG. 1A, shown therein is a block diagram of a data storage arrangement 100 constructed in accordance with an embodiment of the present invention. In what follows, similar or identical structure is identified using identical callouts.

The data storage arrangement 100 is a block diagram of a host computer 102 in communication 104 with a data storage system 106 when powered, such as by a power supply 108, which could be AC or DC for example. The data storage system 106 is capable of comprising at least one random access memory device adapted to be power cycled in at least an on and off condition, but could include a power state in between, such as a partial power down state for example. The host computer 102 could be a personal computer, a main frame computer, a server, or any computer system linked to the storage system 106, just to name a few examples. The communication path 104, at a minimum, needs only to facilitate communication between the host computer 102 and the storage system 106. The means for communication could be accomplished by a dedicated pathway (such as a SCSI [Small Computer Systems Interface] cabled connection) or, in an alternative embodiment, a pathway over a network (such as a LAN, WAN, or other communication architecture), for example. Furthermore, the communication path could be in the form of a wire line pathway, wireless, or a combination thereof, for example. Finally, the storage system 106 is capable of storing and retrieving data for the host 102. Examples of a storage system include a disc drive or multiple disc drives, a storage library, such as a virtual tape library and disc drive magazine library, just to name a few.

Figure 1B:
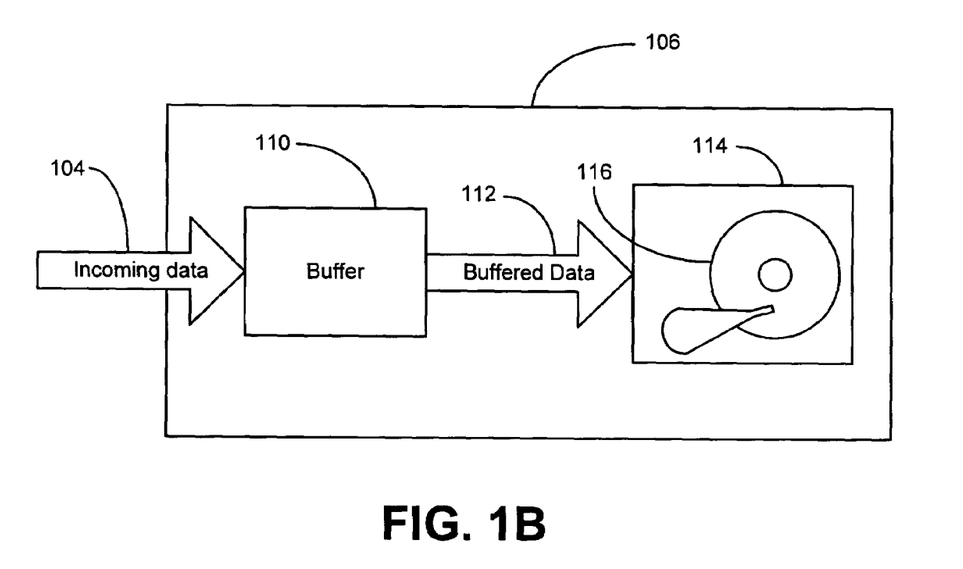
FIG. 1B is a block diagram of a data storage system constructed in accordance with an embodiment of the present invention.

FIG. 1B shows a flow diagram of a typical embodiment for storing data within a data storage system 106. Typically, incoming data 104 is received by the storage system 106 via a buffer storage device 110, such as a dynamic random access memory chip for example. The buffer 110 is adapted to receive incoming data 104 and then transmit the data 112 at a buffered rate tailored for the speed at which a storage device, such as a disc drive 114, is capable of storing the data 112. The disc drive 114 comprises at least one storage medium 116, in this case illustratively shown as a magnetic disc. For example, the buffer 110 may receive an entire incoming data packet 104 quickly and yet transmit 112 the data packet at a slower rate, or different rate, usually determined by the disc drive 114 storage rate. As known by a skilled artisan, a buffer 110 could reside in a location different to the one shown here, such as in a host computer 102, a switch (not shown), or a disc drive 114 for example.

Figure 2:
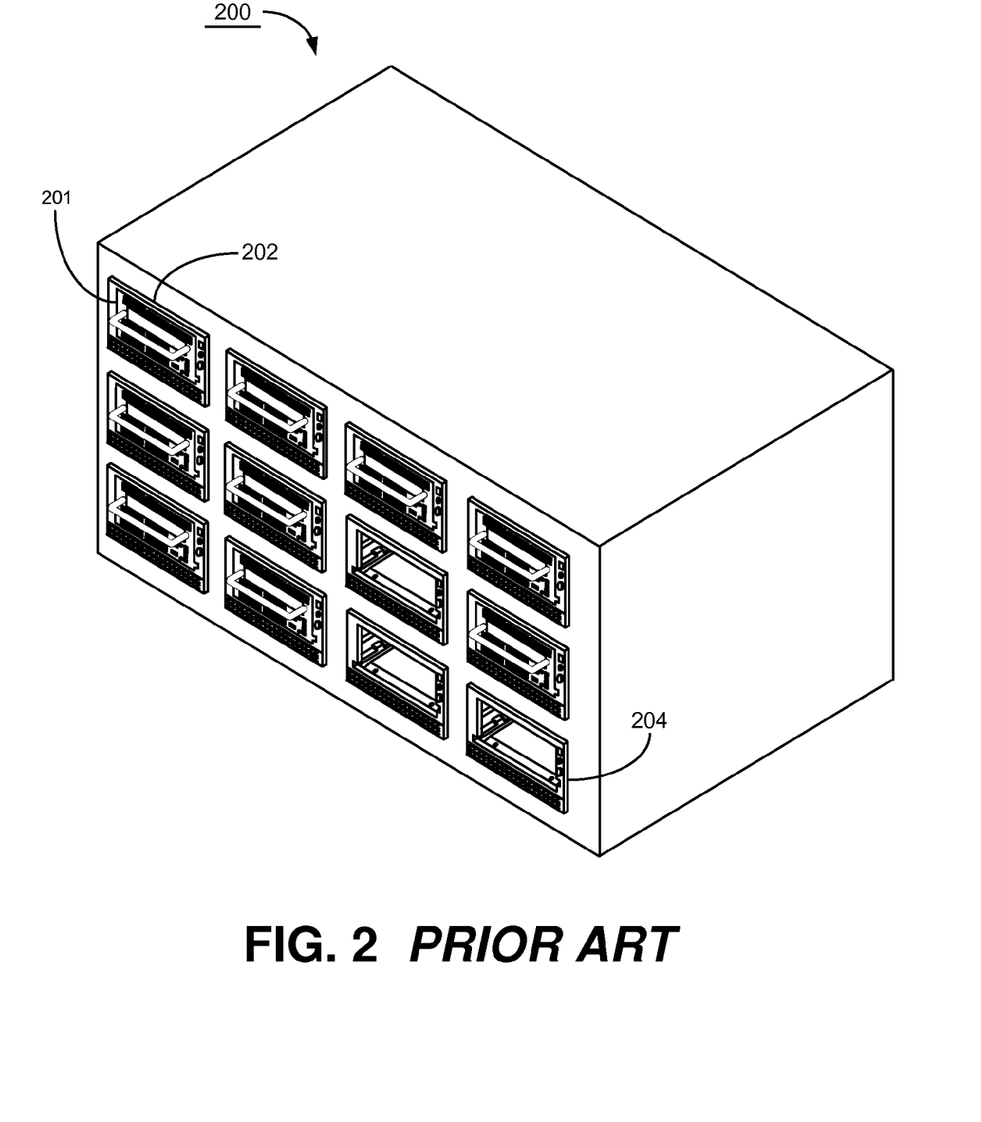
FIG. 2 shows an example of a storage system wherein the present invention could be practiced.

FIG. 2 shows an example of a data storage system 106 in accordance with the present invention. Here, an RXT T-950 disc drive magazine library 200 from Spectra Logic Corp. of Boulder, Colo. comprises a plurality of disc drive magazines 201 and docking stations 202 operatively linked to one another to function as the RXT library 200. The disc drive magazines 201 are adapted for mobility, such as for removal from or insertion into a docking station 202, as illustrated by a vacant docking station 204 capable of receiving a disc drive magazine 201, for example. The RXT library 200 is capable of communicating with a host, such as by the communication path 104 with the host 102, and in one embodiment the communication 104 could be via a streaming protocol, such as a format used for tape medium for example.

Figure 3:
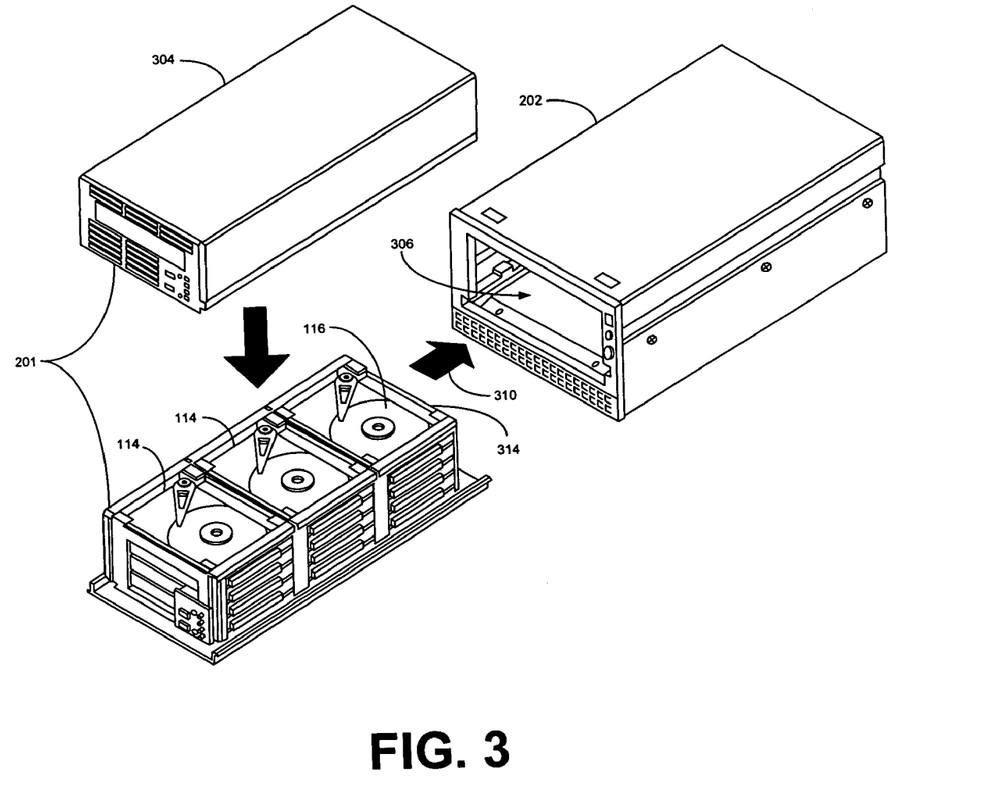
FIG. 3 shows a detailed illustration of an embodiment of a disc drive magazine and docking station.

FIG. 3 shows a more detailed illustration of an embodiment of an RXT disc drive magazine 201 and docking station 202. Here, a plurality of disc drives 114 are substantially contained by an enclosure 304 generally comprising the mobile disc drive magazine 201. A conventional magnetic disc drive 114 is only one embodiment of a random access memory device, which, in further embodiments, could include flash memory and optical memory, just to name a few. The mobile disc drive magazine 201 is adapted to be received by an opening 306 in the docking station 202, as shown by the arrow 310. In an alternative arrangement, the docking station 202 could be used as a stand-alone storage system without being part of a library, such as the library 200. The engaging surface 314 of the mobile disc drive magazine 201 comprises electrical contacts (not shown) to contact with complementary electrical contacts (not shown) on the engaging surface (not shown) of the docking station 202. When contact is made, the transmission of data can occur between the docking station 202 and the mobile disc drive magazine 201. Furthermore, power can be provided to the mobile disc drive magazine 201 by the docking station 202. Power and data transmission provide a cooperatively linked state between the mobile disc drive magazine 201 and the docking station 202. The docking station 202 is capable of being electrically connected with a host device, such as the host computer 102 for example, or other storage device/s, such as the RXT storage library 200 for example, by a coupling means, such as wires, plugs-in, wireless transmission (e.g., IR, RF) or any combination or equivalence thereof, just to name a few examples. By linking the docking station 202 with the storage system 200, a connected disc drive magazine 201 is effectively in a cooperatively linked state with the storage system 200.

While the claimed invention has utility in any number of different applications, the disc drive magazine library 200 has been provided to illustrate a suitable environment in which the claimed invention can be practiced. Here, the disc drive 114 is an embodiment of a non-tape media having certain advantages, such as data retrieval speed, over tape. Other non-tape media having random storage access could include a CD for use with a CDROM or other optical storage media, compact flash, floppy disc, just to name a few. In one embodiment of the present invention, the host computer 102 is capable of communicating with the disc drive magazine library 200 by using one streaming protocol as if the library 200 was a tape library, i.e., a library comprising only tape media (not shown) for use with tape drives (not shown) for example.

Referring back to FIGS. 1A and 1B, in some instances, power 108 supplying a storage system, such as storage system 106, could fluctuate or be reduced to some power level less than enough for full operation of a drive device, such as the disc drive 113. For example, the power 108 may be cycled from an on condition to an off condition, while a data package, which could be a data segment or a plurality of data segments 104, is being received 104 by the buffer 110 or transmitted 112 to the disc drive 114 for storage. One example of this is an "un-safe" power down occurrence while storing data. The consequence of the power reduction may result in an incomplete stored data packet. Under these circumstances, one course of action is to compare all of the primary data with redundant data in the suspect storage device, a disc drive 114 for example, if the storage system 106 supports redundant data capabilities (such as the disc drive magazine library 200), when power 108 is fully re-supplied to the storage system 106. Embodiments of the present invention show improvements to the time consuming data comparing exercise of the entire storage device or devices in question with optional reparations including new data stored over the original data or new data stored following the point of which the disrupted data 112 were terminated, for example.

Figure 4A:
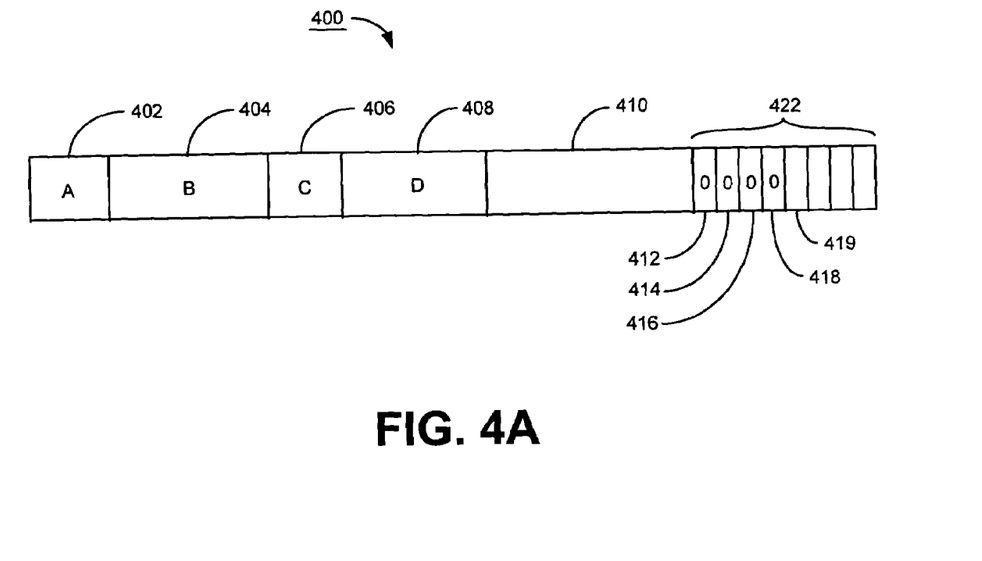
FIG. 4A-4C are simplified schematic diagrams illustrating data segments stored on a storage medium consistent with some embodiments of the present invention.
Figure 4B:
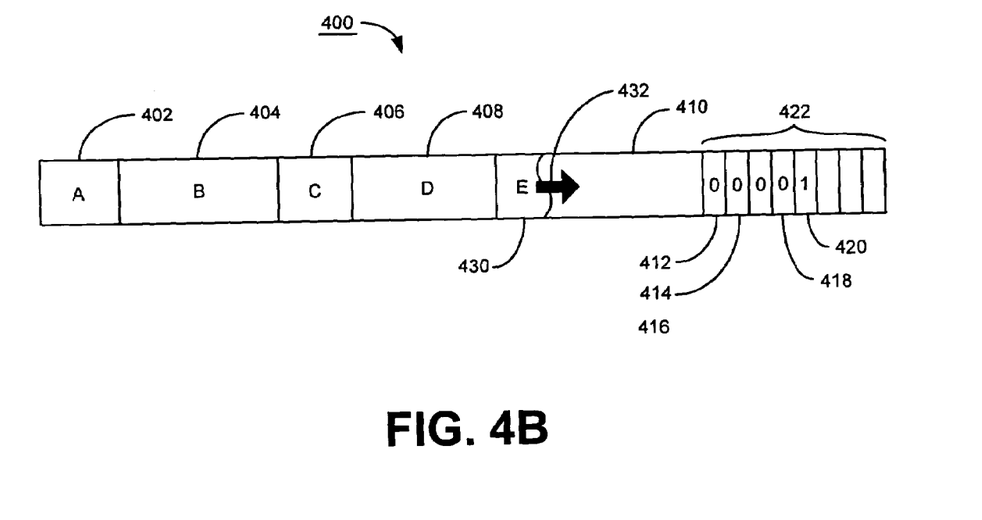
Figure 4C:
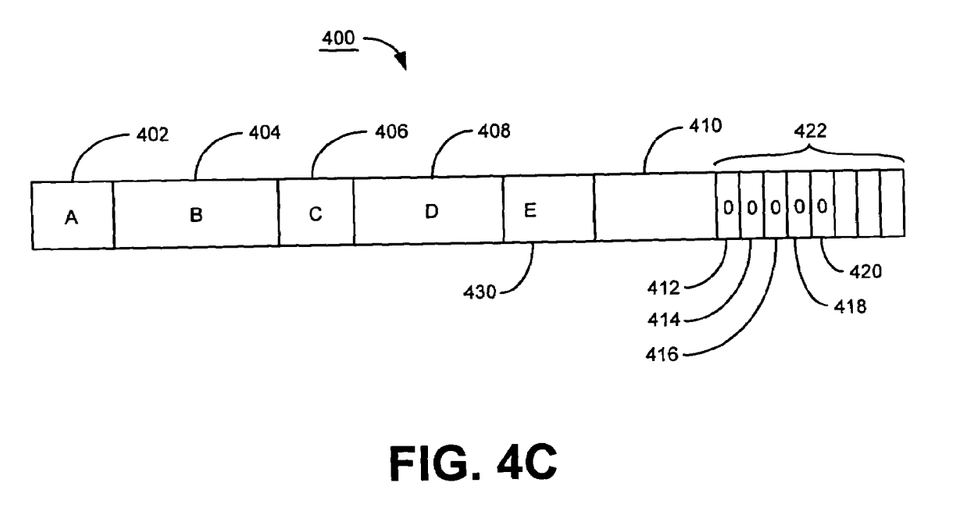

FIG. 4A-4C are simplified schematic diagrams illustrating data segments stored on a storage medium consistent with some embodiments of the present invention. The block diagram of the data herein is arranged for simplicity of explanation and does not require the contiguous or linear order. FIG. 4A shows a stretch of storage medium 400 configured with four saved files, A 402, B 404, C 406 and D 408 (in this embodiment, data segments are files however they could be data blocks, multiple files, fractions of files or blocks, just to name a few examples) and associated respective state bits 412, 414, 416 and 418 comprised by a bit array field 422. In this example, all state bits 412, 414, 416 and 418 in the bit array field 422 register a state associated with the completed storage of the respective files, in this case a [0], and may be stored in a non-volatile memory associated with the storage system 106. The storage medium 400 also comprises available storage space 410 for additional data segments capable of being stored in conjunction with additional state bits, such as an open state bit location 419, located in the bit array field 422.

FIG. 4B shows a data segment 430 during data storage, as indicated by the storage-in-process arrow 432, on the storage medium 400 consistent with an embodiment of the present invention. Here, a state bit for E 420 associated with file E 430 is located in the bit array field 422 and is in a state reflecting the storage-in-process of file E 430. In this embodiment, the state of a state bit, such as the state bit for E 420, during the storage of a data segment is a [1]. In the event power 108 is reduced or eliminated during the storage of file E 430, the associated state bit for E 420 registering [1] will be preserved in non volatile memory as an indicator of the unfinished storage state of file E 430.

FIG. 4C shows the data segment 430 after storage has been completed on the storage medium 400 consistent with embodiments of the present invention. Herein, file E 430 has been fully stored and the associated state bit for E 420 is converted to the state [0] reflecting a storage completion status. In the event power 108 is reduced or eliminated after the completion of the storage of file E 430, the associated state bit for E 420 registering [0] will be preserved, along with all other state bits in the bit array field 422, in non volatile memory as an indicator of the storage state of all the files, A 402, B 404, C 406, D 408 and E 430.

Figure 5:
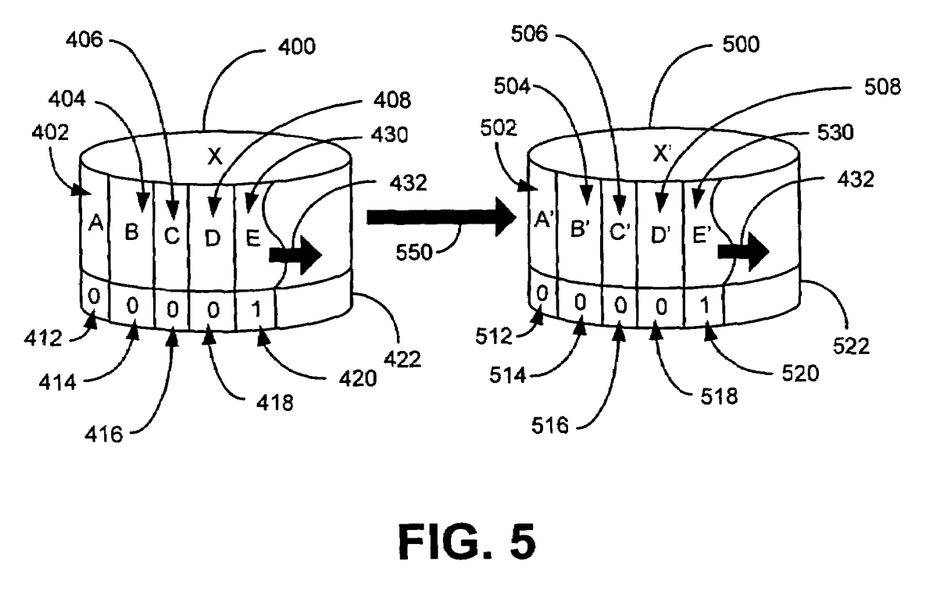
FIG. 5 shows a RAID-1 configuration used to back-up and to compare data consistent with embodiments of the present invention.

Referring to FIG. 5, shown therein is a RAID-1 configuration used to back-up and compare data consistent with embodiments of the present invention. Herein, FIG. 5 is configured similarly to FIG. 4B, with similar callouts for purposes of illustration. A RAID-1 configuration takes advantage of mirroring stored information of a first storage medium, shown here as X 400, to a second storage medium, shown here as X' 500. It should be recognized that the mirrored data, such as from file A 412 and file A' 512, could be transmitted 550 from one storage device comprising at least one storage medium, such as X 400, to another storage device comprising at least one storage medium, such as X' 500, or alternatively data segments, such as file A 402 and file A' 502, could be saved substantially concurrently on the relative storage media X 400 and X' 500, just to name a couple of examples.

The first storage medium X 400 comprises files A 402, B 404, C 406 and D 408 with associated respective state bits 412, 414, 416 and 418 comprised by the X bit array field 422. The first storage medium X 400 also comprises partially stored file E 430, as shown by the storage-in-process arrow 432, with the associated state bit for E 420 registering [1], indicating an incomplete storage status of file E 430. Likewise, the mirrored RAID-1 storage medium X' 500 comprises files A' 502, B' 504, C' 506 and D' 508 with associated respective state bits 512, 514, 516 and 518 comprised by the X' bit array field 522. The bit array field 522 is redundant to bit array field 422 as added protection to preserving the state bit data stored within the bit array fields. The second storage medium X' 500 also comprises partially stored file E' 530 with the associated state bit for E' 520 registering [1] indicating an incomplete storage status of file E' 530. In the event the storage devices supporting the media X 400 and X' 500 are unable to completely store file E 420 and E' 520, such as if power 108 was reduced or eliminated to the storage devices 400 and 500, then the respective state bits 420 and 520 would remain registered in a state of [1] in non volatile memory. Upon re-energizing, or powering the storage devices X 400 and X' 500 to an on condition, the state bits for E 420 and E' 520 registering a [1] would indicate incomplete storage of files E 430 and E' 530 to the storage system 106 comprising the storage device for X 400 and X' 500.

In one example, if the storage devices comprising media X 400 and X' 500 are energized, or powered-on, from a power state of less than fully operational and the state bits for E 420 and E' 520 register a [1], then the files E 430 and E' 530 are identified as failing to completely store their data; hence, the threat of incomplete or corrupted data can be isolated to files E 430 and E' 530. By isolating the specific data segments, such as segment E 430, time can be saved in restoring data or analyzing the degree of failure after the power-on condition is met with the storage device comprising the media X 400 and X' 500. Data can be compared bit by bit between files E 430 and E' 530 to determine if the data was complete and if restoration of any missing data is possible or if re-writing a portion of or the entire data segment is required, etc.

Figure 6A:
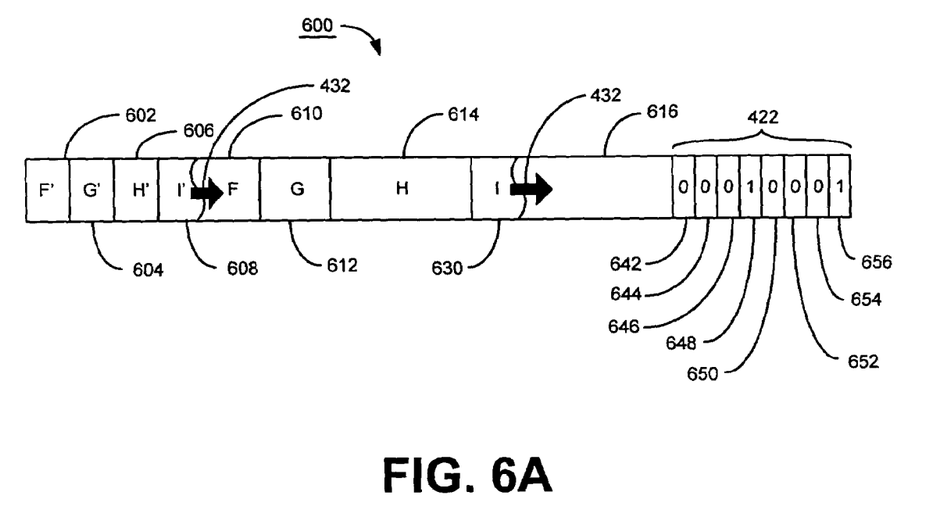
FIG. 6A-6C shows alternative embodiments of the present invention wherein additional data entries associated with a data segment also generate at least one associated state bit.
Figure 6B:
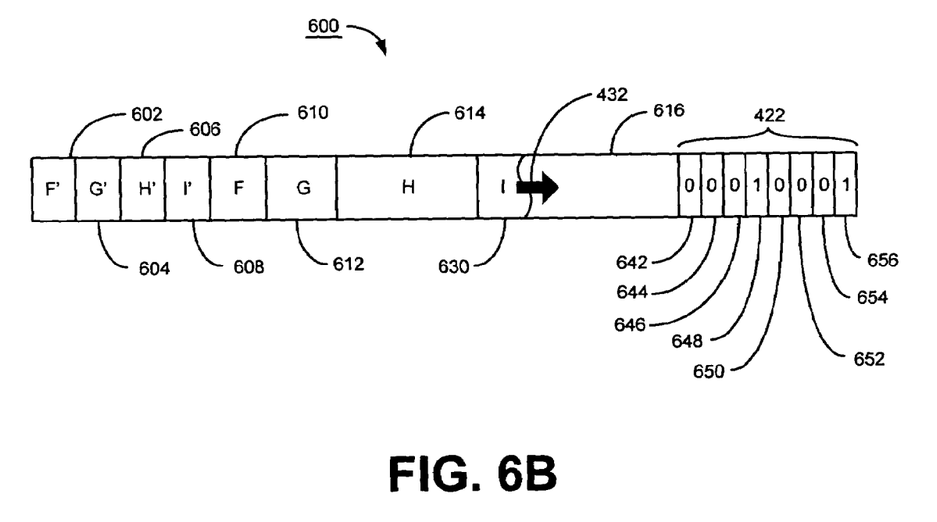
Figure 6C:
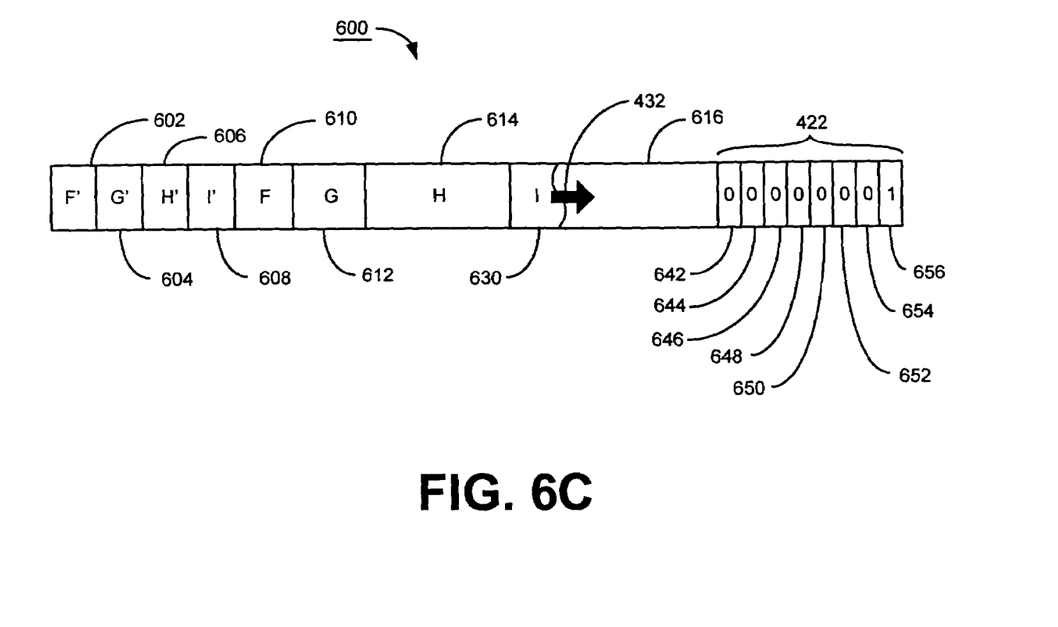

FIG. 6A-C shows alternative embodiments of the present invention wherein additional data entries associated with a data segment also generate at least one associated state bit. In this embodiment, a storage medium 600 comprises fully stored data segments F 610, G 612, H 614 and partially stored data segment I 630, as shown by the storage-in-process arrow 432, and available storage space 616 in addition to respective associated data entries F' 602, G' 604, H' 606 and I' 608. Corresponding state bits, 650, 652, 654, 656, 642, 644, 646 and 648 associated with both the data segments F 610, G 612, H 614, I 630 and associated data entries F' 602, G' 604, H' 606 and I' 608 are comprised by the bit array field 422. Here, the bit array field 422 is located in non-volatile memory on the storage medium 600. Examples of the associated state bits could be a file system managed entry for the data segment F 610, a table entry for the data segment F 610 or a title entry for data segment F 610 just to name three. In this embodiment, partially stored data segment I 630 and associated data entry I' 608, that may also be partially stored, have respective associated state bits 656 and 648 respectively which both register [1] reflecting the unfinished storage state of I 630 and I' 608. FIG. 6B shows an alternative embodiment, I' 608 could be fully finished storing but still may register a [1] because of the unfinished storage state of I 630. FIG. 6C shows yet another alternative embodiment wherein I' 608 could be fully finished storing and may register a state bit 648 [0] located in the bit array field 422 and wherein the unfinished storage state of I 630 would still register a state bit 656 [1]. With respect to FIG. 6C, by isolating segment I 630, as suspect data from an un-safe power down, time can be saved by analyzing or performing restorative operations to just segment I 630 after a power-up operation to the storage device comprising the medium 600. The same logic can be applied to the scenario wherein the state bit 648 for I' 608 also registers a [1].

Figure 7:
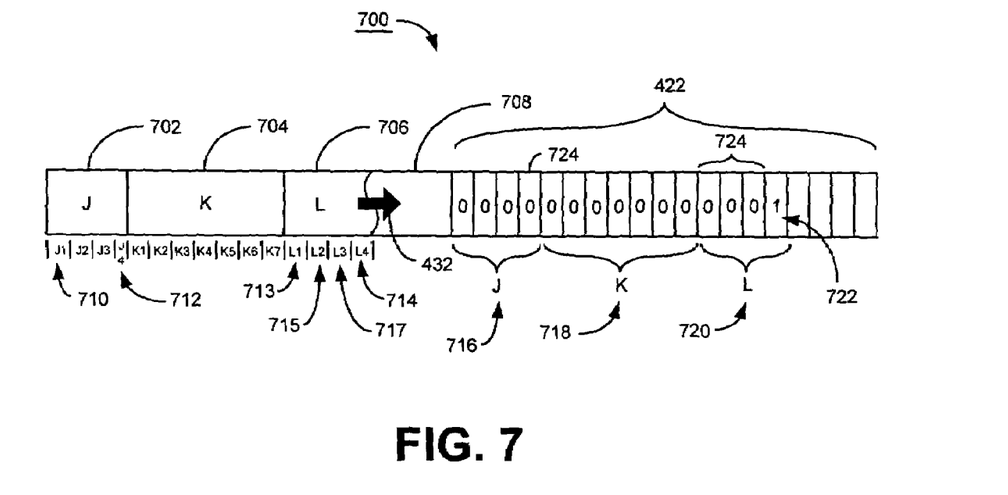
FIG. 7 shows another alternative embodiment of the present invention wherein data segments are less than or equal a predetermined size.

FIG. 7 shows yet another alternative embodiment of the present invention wherein data segments are less than or equal a predetermined size. Herein, a storage medium 700 comprises files J 702, K 704 and partially stored file L 706, as shown by the storage-in-process arrow 432 in addition to available storage space 708. Files J 702, K 704 and L 706 are partitioned as data segments of less than or equal to a predetermined data size, shown here as J1 710 for example, and have associated state bits; four J state bits 716, seven K state bits 718 and four L state bits 720. File J 702 comprises a data segment J4 712 that is smaller than a predetermined size having an associated J4 state bit 724. This accommodates a specific file, such as file J 702, to comprise data segments solely dedicated to the specific file. Partially stored file L 706 has completed segments L1 713, L2 715 and L3 717 with the three corresponding L state bits 724 registering [0] in the bit array field 422 and partially stored segment L4 714 with a fourth corresponding L4 state bit 722 registering [1]. In this embodiment, by isolating segment L4 714, as suspect data from an un-safe power down, time can be saved by analyzing or performing restorative operations to just segment L4 714 after a power-up operation to the storage device comprising the medium 700.

Figure 8:
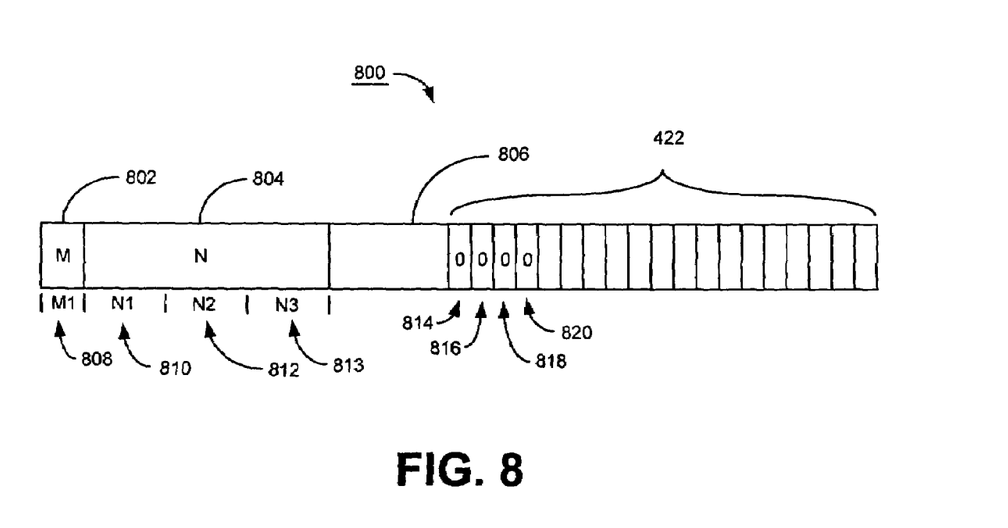
FIG. 8 shows another alternative embodiment of the present invention wherein a data segment can be the smaller of either the packet of data received or the predetermined size.

FIG. 8 shows yet another alternative embodiment of the present invention wherein a data segment can be the smaller of either the packet of data received or the predetermined size. In other words, if a packet of data for storage is smaller than a predetermined sized data segment then the data packet can stand alone as a data segment with an associated state bit. Herein, a storage medium 800 comprising fully stored files M 802 and N 804, which in this case are two data packets, in addition to available storage space 806 and at least one bit array field 422. File N 804 is partitioned in three data segments of which are all a predetermined size; N1 810, N2 812 and N3 813 with associated N1 state bit 816, N2 state bit 818 and N2 state bit 820. File M 802 is smaller than the predetermined data segment size, such as N1 810, but is stored nonetheless as an individual data segment with an associated M1 state bit 814.

Figure 9:
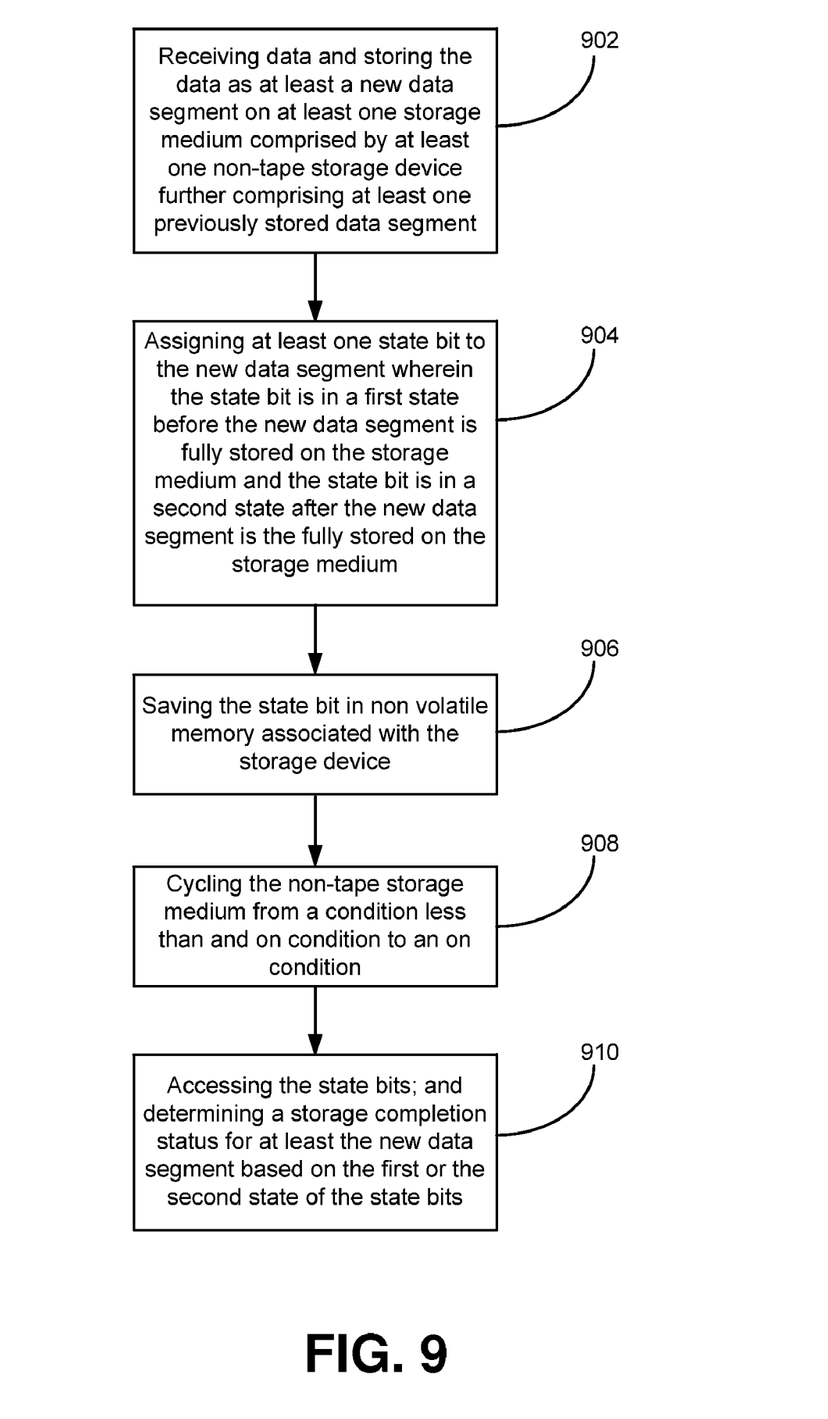
FIG. 9 shows a method for analyzing data integrity in a data storage system consistent with embodiments of the present invention.

Referring now to FIG. 9, shown therein is a method for analyzing data integrity in a data storage system, such as 106 of FIG. 1B, consistent with embodiments of the present invention. It should be recognized that the steps presented in the described embodiments of the present invention do not require any particular sequence. In step 902, the storage system, such as the RXT T-950 disc drive magazine library 200 of FIG. 2, is capable of receiving data and storing the data as at least one new data segment, such as data segment N1 810 of FIG. 8, on at least one storage medium, such as the magnetic disc 116, comprised by at least one non-tape storage device, such as the RXT disc drive magazine 201. The storage device comprises at least one previously stored data segment, such as M1 808, having an associated state bit, such as state bit 814. Means for receiving and storing data could be over a SCSI cable for storage on a disc drive, such as the disc drive 114, for example. In step 904, at least one state bit, such as L4 state bit 722, is assigned to the new data segment, such as data segment L4 714, wherein the state bit is in a first state before the data segment is fully stored, such as registering a [1], on the storage medium, such as 700, and the state bit is in a second state, such as registering a [0], after the data is fully stored on the storage medium. Means for assigning at least one state bit to the data segment could be via a program capable of assigning the state bit registering a first state, such as a [1], concurrently with the first bit of data saved in the data segment following assigning a second state to the state bit, such as a [0], after the data segment is fully saved, such as when a buffer 110 is purged of data for example. In step 906, the state bit is saved in non volatile memory, such as a section on the magnetic disc 116, associated with the storage device. Means for saving a state bit in non-volatile memory could be with an algorithm saving the state bit on a dedicated space on a disc 116 for example. In step 908, the non-tape storage medium is cycled from a condition less than an on condition to an on condition. An example is power outage in the storage system 106 followed by power the storage system 106 back on. A means for cycling the power could be an on/off switch for example. In step 910, the state bits are accessed to determine a storage completion status of at least the new data segment and alternatively all of the data segments based on the first or the second state of the state bits. A means for accessing and determining a storage completion status could be with an algorithm that automatically executes upon a powered on state of the storage device, such as a disc drive 114, to search for any state bits registering a [1] such as in a bit array field 422. This method, as previously disclosed, can be used to identify the health of the data segments, such as N3 813, if a storage system, such as storage system 106, loses power while attempting to save data for example.

Figure 10:
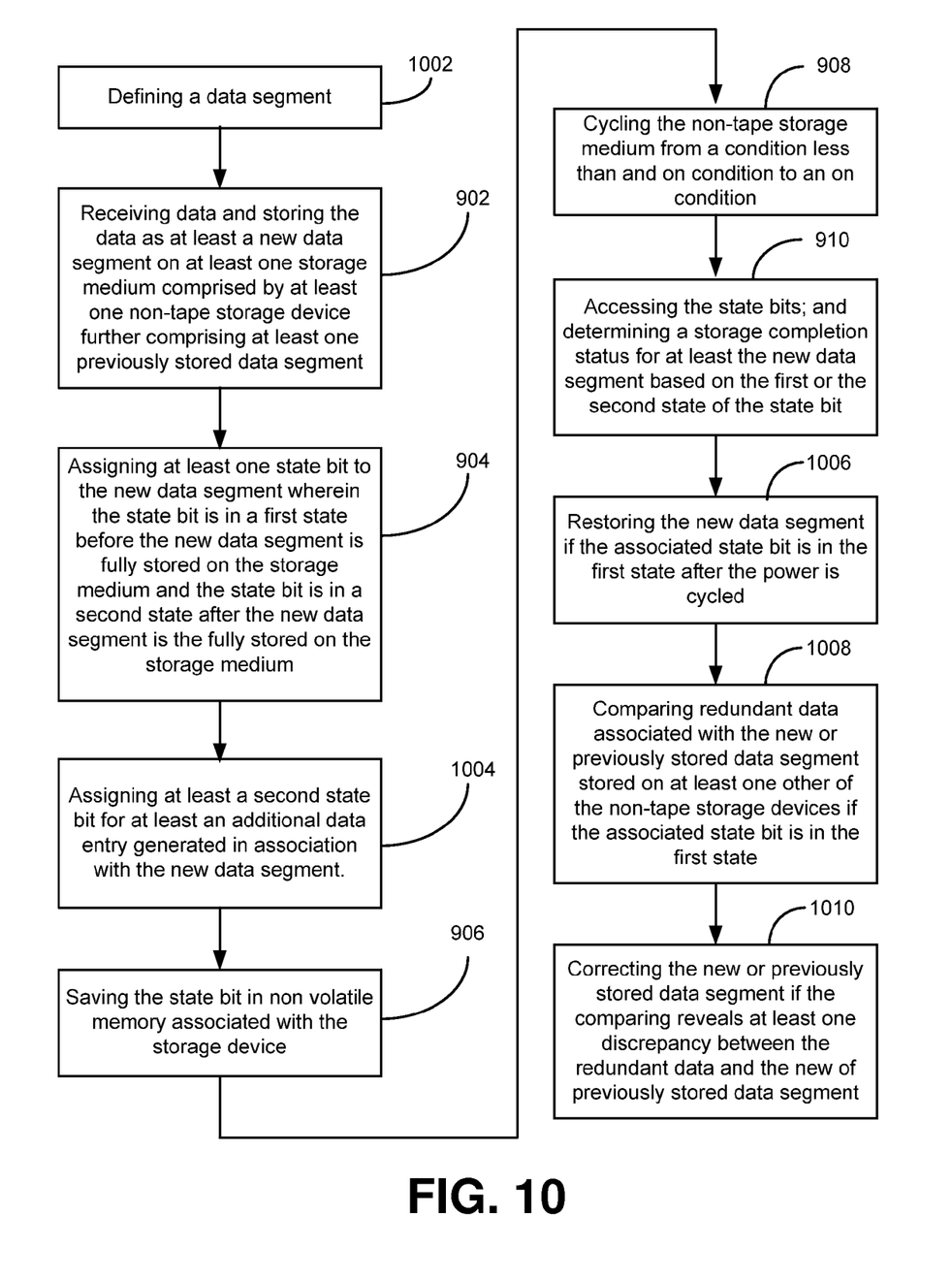
FIG. 10 shows some alternative embodiments of the present invention which includes method steps 902, 904, 906, 908 and 910 from FIG. 9.

FIG. 10 shows some alternative embodiments of the present invention which includes method steps 902, 904,906, 908 and 910 from FIG. 9. For the embodiment in step 1002, a data segment, such as such as data segment N1 810, can be defined, such as a certain data size or within a certain data received over a specific time period. In yet another embodiment as shown in step 1004, at least a second state bit, such as state bit for F' 642 of FIG. 6A, can be assigned for at least an additional data entry, such as data segment F' 602, generated in association with the new data segment, such as 610 for example. Step 1006 shows yet another embodiment of the present invention wherein a data segment, such as L4 714, can be restored if the associated state bit, such as state bit L4 720, is in the first state, such as when registering a [1], when a storage device, such as the disc drive 114, is re-powered following the power cycle in step 908. Step 1008 is an embodiment of the present invention wherein redundant data, such as data segment E' 530 of FIG. 5, is compared with a new or previously stored data segment, such as data segment E 430, stored on at least one other non-tape storage device, such as that stored on a redundant media X' 500, if the associated state bit of the new or previously stored data segment is in the first state, such as registering a [1] for example. The means for comparing data could be by a program that is initiated by a user or could be automatically executed based on the state bit, for example. In step 1010 the new or previously stored data segment, such as data segment E 430, is corrected if the comparison step 1008 reveals at least one discrepancy between the redundant data, such as E' 530, and the new or previously stored data segment, E' 430.

Embodiments of the present invention could be commercially practiced with an RXT T-950 storage system 200 of FIG. 2, performing as a storage system 106, for use with RXT disc drive magazines 201. As previously described, an RXT disc drive magazine 201 encases a plurality of disc drives, such as 308, which can be provided by Seagate Corporation of Scotts Valley, Calif. A host computer 102 is capable of communicating with the RXT T-950 storage system 200 by means of a SCSI tape (streaming) protocol, such as that provided by Veritas Corporation of Mountain View, Calif., whereby the RXT T-950 storage system 200 can appear in a virtual sense as a traditional tape-based library to the host 102. Hence, data sent to and retrieved from the RXT T-950 storage system 200 can be in the form of a sequential tape format. The data can be saved in five mega-byte data segments or less such as in file J 702, with an associated state bit, such as the state bits for J 716, generated and stored redundantly in two dedicated bit array fields in non-volatile memory on at least two of the disc drives 114 in the RXT disc drive magazine 201. For redundancy the bit array field 422 can be duplicated on additional alternate disc drives 114. The associated state bit registers a [1] upon the first bit of data stored for each data segment, such as data segment L4 714 and the associated L4 state bit 722, and registers a [0] when either the RXT T-950 200 has completely stored a data packet that is smaller than five mega-bytes, resulting in a less than five mega-byte segment, or five mega-bytes of data has been reached, such as the scenario similar to file J 702. The data can be coincidentally saved across four additional disc drives 114 in the RXT disc drive magazine 201 in a RAID-5 configuration. In the event power is cut-off from at least one of the RXT disc drive magazines 201 while data is being stored as a data packet, such as in L4 714, the associated state bit remains in a [1] state in non-volatile memory, such as in the state bit for L4 722. Upon re-energizing the RXT disc drive magazine 201, the bit array fields 422 are accessed to determine the storage state of the data packets, such as L4 714 for example. If a state bit registering a [1], such as the state bit for L4 722, is discovered then the associated data packet, such as L4 714, is compared with the redundant data stored across the RAID-5 disc drives 114. If there is a discrepancy between the data stored on the primary drive 114 and the RAID-5 drives and the data is reparable with the redundant data, then the data on the primary drive 114 is repaired. If the data is not repairable, then the data must be re-stored either from a buffer containing the information or from the originating source of the data, for example.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple files could have associated state bits registering an incomplete data storage state while still maintaining substantially the same functionality without departing from the scope and spirit of the present invention. Further, the data segments stored are not required to be the last data stored on the drive, but could be a continuation of an older file being updated or amended without departing from the scope and spirit of the present invention. In addition, each data packet received can be divided into a specific quantity of data segments, for example every data packet received could be divided into five data segments regardless of the size of the data packet, without departing from the scope and spirit of the present invention. Further, the state bits could be used to monitor the storage state of one family of data segments, or in a preferred embodiment, all of the segments of data stored in a storage system, such as the storage system 106 for example, without departing from the scope and spirit of the present invention. Finally, although the preferred embodiments described herein are directed to random access media, such as the disc drive 114, and related technology, it will be appreciated by those skilled in the art that the teachings of the present invention can be applied to other systems, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A data storage system comprising:
    at least one random access memory storage device adapted to be power cycled in at least an on and off condition;

the random access memory storage device comprising at least one storage medium comprising a first stored data segment;

the storage device adapted to receive data for storage on the medium in at least a second data segment;

at least one state bit having a first state associated with the second data segment during the storage of the second data segment and a second state associated with the second data segment after completion of the storage of the second data segment wherein the state bit is stored in non volatile memory associated with the storage device; and the state bit capable of being accessed via an algorithm operated by the data storage system to determine completion status of the storage of at least the second data segment after the storage device is power cycled in the on condition.

2. The data storage system of claim 1 further comprising an algorithm capable of restoring at least the second data segment if the state bit is in the first state when the random access memory storage device is power cycled in the on condition.

3. The data storage system of claim 1 wherein there is a sufficient number of random access memory storage devices capable of storing data in a RAID configuration and wherein at least the second data segment is compared with redundant data associated with at least the second data segment to check for data integrity when the state bit is in the first state after at least one of the storage devices are power cycled in the on condition.

4. The data storage system of claim 3 wherein the redundant data is parity data.

5. The data storage system of claim 1 wherein the received data is stored in tape emulated format.

6. The data storage system of claim 1 wherein the random access memory storage device is selected from the group consisting of: flash memory, optical media, magnetic disc drive, disc drive magazine, magneto-optical drive, and floppy disc.

7. The data storage system of claim 1 wherein the first and second data segments are from the group consisting of: a predetermined data size, an individual packet of the data received, a specific quantity of the data segments per packet of the data received, and the smaller of the individual packet of the data received or the predetermined data size.

8. The data storage system of claim 1 wherein there is a first state bit associated with the second data segment and a second state bit associated with a data entry generated in association with the second data segment.

9. The data storage system of claim 1 further comprising a bit array field wherein the state bit is stored.

10. The data storage system of claim 1 further comprising at least one redundant state bit stored in non volatile memory associated with a second random access memory storage device.

11. The data storage system of claim 1 wherein all of the data segments stored on the at least one random access memory storage device are managed by at least one of the state bits associated with each of the data segments.

12. A method for analyzing data integrity in a data storage system comprising the steps of:

receiving data;

storing the data as at least a new data segment on at least one storage medium comprised by at least one non-tape storage device further comprising at least one previously stored data segment;

assigning at least one state bit to the new data segment wherein the state bit is in a first state before the new data segment is fully stored on the storage medium and the state bit is in a second state after the new data segment is the fully stored on the storage medium;

saving the state bit in non volatile memory associated with the storage device;

cycling the non-tape storage medium from a condition less than an on condition to an on condition;

accessing the state bits; and determining a storage completion status for at least the new data segment based on the first or the second state of the state bit.

13. The method of claim 12 wherein the saving of the state bit is in a bit array field capable of containing at least one other state bit associated with at least one of the previously stored data segments.

14. The method of claim 12 further comprising defining a data segment.

15. The method of claim 12 further comprising restoring the new data segment if the associated state bit is in the first state after the cycling step.

16. The method of claim 12 further comprising comparing redundant data associated with the new or previously stored data segment stored on at least one other of the non-tape storage devices if the associated state bit is in the first state.

17. The method of claim 16 further comprising correcting the new or previously stored data segment if the comparing reveals at least one discrepancy between the redundant data and the new or previously stored data segment.

18. The method of claim 12 further comprising assigning at least a second state bit for with at least an additional data entry generated in association with the new data segment.

19. A data storage system analyzing data integrity comprising:

means for receiving data;

means for storing the data as at least a second data segment on at least one storage medium comprised by at least one non-tape storage device already comprising a first data segment;

means for assigning at least one state bit to the second data segment wherein the state bit is in a first state before the second data segment is fully stored on the storage medium and the state bit is in a second state after the second data segment is the fully stored on the storage medium;

means for saving the state bit in non volatile memory associated with the storage device;

means for cycling the non-tape storage medium from at least an off condition to an on condition;

means for accessing the state bit; and means for determining a storage completion status based on the first or the second state of the state bit.

20. A data storage system of claim 19 further comprising means for comparing redundant data associated with at least the first data segment stored on at least one other of the non-tape storage devices if the associated state bit is in the first state and means for correcting at least the first data segment if the comparing reveals at least one discrepancy between the redundant data and at least the first data segment.

21. A data storage arrangement comprising:

a host computer;

a storage system in communication with the host computer, the storage system comprising at least one random access storage medium adapted to be power cycled in at least an on and off condition;

the random access storage medium adapted to receive at least one new data segment by streaming protocol for storage of emulated in a contiguous sequential format and wherein the random access storage medium already comprises at least one old data segment previously stored in the format;

at least one state bit having a first state associated with the new data segment during the storage of the new data segment and a second state associated with the new data segment after completion of the storage of the new data segment wherein the state bit is stored in non volatile memory associated with the random access memory storage device; and the state bit capable of being accessed to determine completion status of the storage of the new data segment when the random access memory storage device is power cycled in the on condition.

22. The data storage arrangement of claim 21 wherein all data stored on the storage system comprise data segments wherein each of the data segments is associated with one of the state bits.

23. A method for checking integrity of a data segment stored on a data storage medium associated with a data storage library, comprising the steps of:

detecting a power fluctuation condition to the data storage library, and upon detection and completion of the power fluctuation condition, checking a state bit stored in a non volatile memory associated with the data segment to determine whether such data segment has a desired integrity wherein said state of said state bit is stored prior to completion of storing said data segment.

24. The method of claim 12 wherein the steps are performed in order from said receiving step to said determining step.

* * * * *